United States Patent [19]

Fleming

[11] Patent Number: 4,474,336

[45] Date of Patent: Oct. 2, 1984

[54] METHOD AND MEANS FOR ADJUSTING A FORAGE HARVESTER SHEAR BAR RELATIVE TO A ROTATING CHOPPING CYLINDER

[75] Inventor: Phillip F. Fleming, West Bend, Wis.

[73] Assignee: Gehl Company, West Bend, Wis.

[21] Appl. No.: 435,565

[22] Filed: Oct. 21, 1982

Related U.S. Application Data

[63] Continuation of Ser. No. 166,105, Jul. 7, 1980, abandoned.

[51] Int. Cl.³ ............................................. B02C 18/16
[52] U.S. Cl. ..................................... 241/221; 83/349; 83/356.1; 83/658; 144/218; 241/241; 241/286
[58] Field of Search ............... 241/221, 222, 240, 241, 241/286; 83/349, 356.1, 658; 144/218

[56] References Cited

U.S. PATENT DOCUMENTS 4,055,309 10/1977 Fleming et al. ..................... 241/222

*Primary Examiner*—Howard N. Goldberg
*Assistant Examiner*—Timothy V. Eley
*Attorney, Agent, or Firm*—James E. Nilles

[57] ABSTRACT

A method and means for adjusting a forage harvester shear bar relative to its rotating cylinder. The outer end of the shear bar, the central portion of the shear bar and the inner end of the shear bar can all be selectively adjusted while the cylinder is rotating, these adjustments being made from the outer or operator's side of the harvester and at a common location. All of the shear bar adjusting means are located at one convenient and safe area at the outer or operator's side of the machine and the operator can accurately adjust the outer, central or inner end of the bar by noting the "tick" noise created when the particular end or portion of the shear bar being adjusted touches or comes in contact with the rotating knife of the cylinder. This method and structure for permitting the operator to accurately adjust any portion of the shear bar while the cylinder is rotating and to make these adjustments without being endangered by the rotating cylinder results in adjustments which can be quickly and safely made.

2 Claims, 11 Drawing Figures

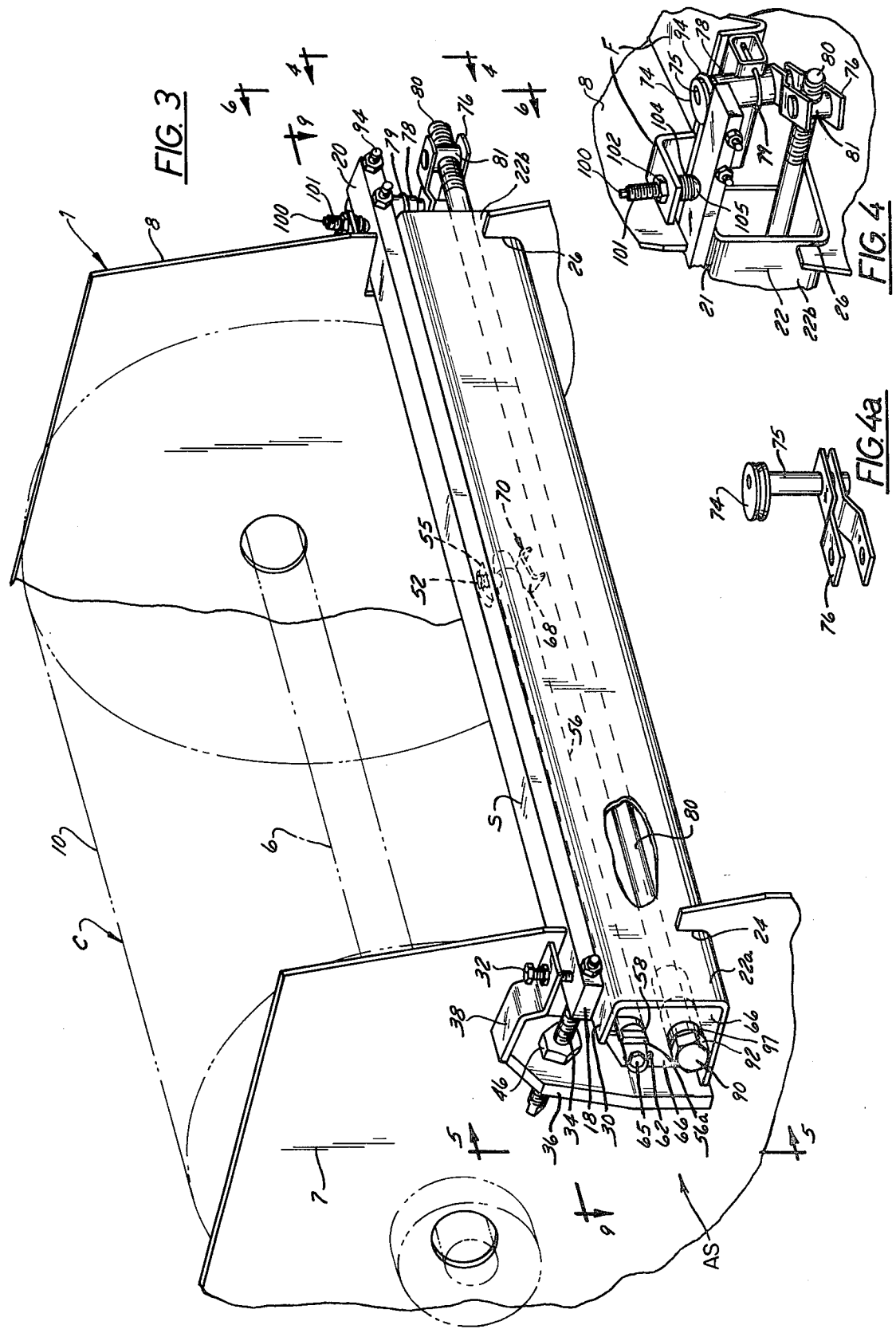

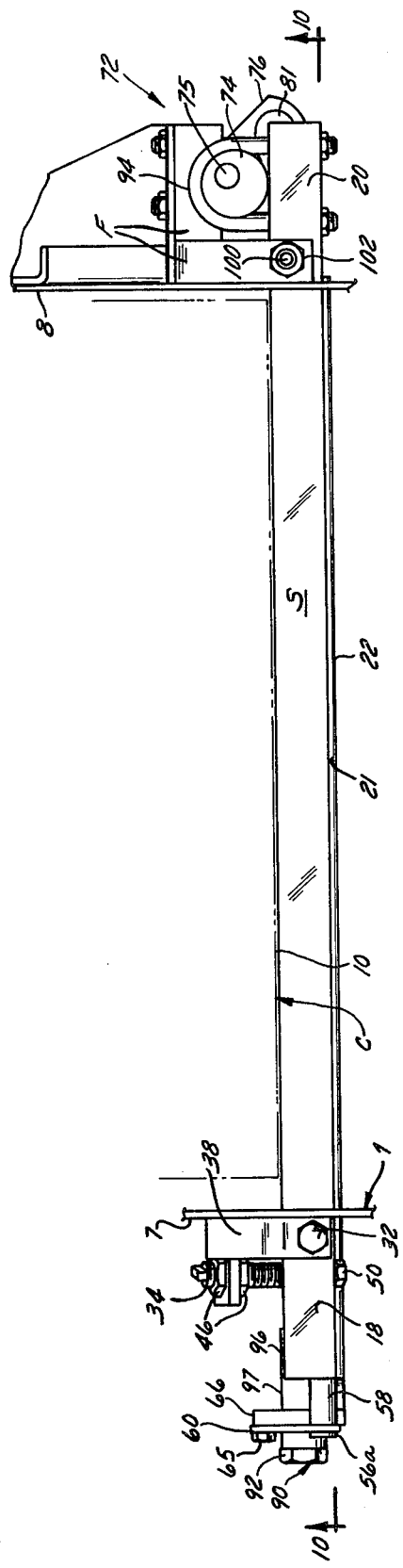
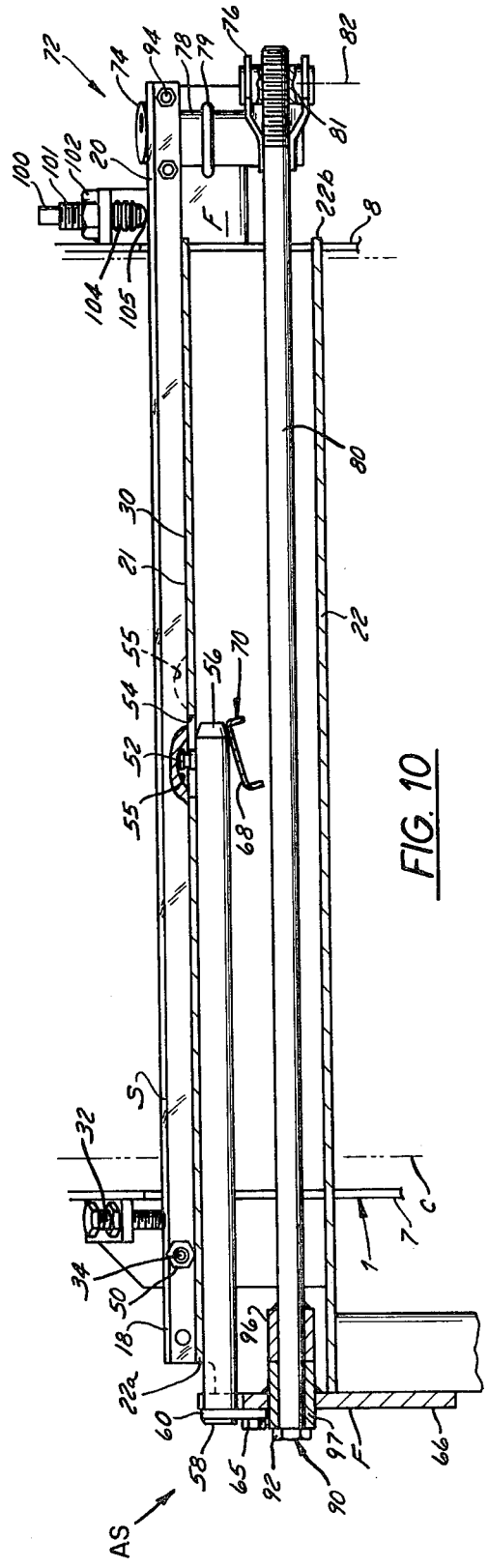

METHOD AND MEANS FOR ADJUSTING A FORAGE HARVESTER SHEAR BAR RELATIVE TO A ROTATING CHOPPING CYLINDER

REFERENCE TO CO-PENDING APPLICATION

This is a continuation of the co-pending U.S. application Ser. No. 166,105 filed July 7, 1980, now abandoned.

BACKGROUND OF THE INVENTION

The present invention relates to forage harvesters having rotating cutting cylinders and an elongated, stationary shear bar supported on the harvester in close adjacent relationship to the cutting cylinder so that the crop material is chopped between the knives of the cylinder and the stationary shear bar. Various adjustment means have been provided for the shear bar for adjusting the position of the shear bar relative to the knives to ensure good cutting action. One example of prior art adjusting means is shown in the U.S. Pat. No. 4,055,309 issued Oct. 25, 1977, and entitled "Adjustable Cutter Bar Support" and in which I am a co-inventor. That patent has been assigned to an assignee common with the present invention. The adjusting means shown in that patent provided for adjustment for each end of the shear bar as well as the central portion of the length of the shear bar, relative to the chopping cylinder. That prior art device operated entirely satisfactory for the purposes for which it was designed. However, the inner end of the shear bar is located in a relatively inaccessible area of the machine and in close relationship with other components of the harvester so that it is difficult for the operator to reach the inner end of the shear bar to make the necessary adjustment in those cramped quarters. The other end of the shear bar, however, located at the outer or operator's side of the machine is readily accessible to the operator for performing the necessary adjustments of the shear bar.

Heretofore, the cutterbars or shear bars were set to the cylinder knives by using a feeler gauge to determine the correct setting of the cutterbar as it was moved toward the cylinder knife. This method was extremely slow and required the operator to move from one side of the machine to the other to finally obtain the proper setting. During the whole operation, the cylinder could not be rotatably driven.

SUMMARY OF THE INVENTION

The present invention provides an improved method and means for selectively adjusting both ends and/or the center of the shear bar of a forage harvester relative to the knives of the chopping cylinder of the harvester, the adjusting for the entire bar being made from a common adjusting station or location at the outer side of the harvester and while the cylinder is rotatably driven by the tractive vehicle. This improved means includes adjusting the inner end of the shear bar from the outer or operator's side of the machine and at the same location at which the adjustment is made for the outer end of the shear bar.

A more specific aspect of the invention relates to such an improved adjusting means for the inner end of the bar which has a rotatably adjustable cam mounted adjacent the inner end of the shear bar and connected between the shear bar and a stationary frame of the harvester. The cam is adjusted by means of a crank and an adjusting rod means connected thereto and extending transversely across the machine to the outer side of the machine. The rod means includes a threaded shaft which is adjusted longitudinally by turning a nut in threaded engagement with its outer end, which nut is located at the operator's accessible side of the machine. Means are also provided at the inner end of the shear bar for resiliently holding it down against its support member whereby it is unnecessary to loosen the conventional set screw arrangement in order to adjust the position of the inner end of the shear bar.

The present invention gathers all the shear bar adjusting stations at one convenient and safe location at the outer or operator side of the machine and permits the operator to adjust the entire bar while the cylinder is driven. In this manner, as the bar is moved toward the rotating cylinder, the operator knows when the bar has reached the terminal or optimum position due to the "tick" noise created when the bar touches the rotating knife. This method is quicker and more accurate than the prior art method.

These and other objects and advantages of the present invention will appear hereinafter as this disclosure progresses, reference being had to the accompanying drawings.

BRIEF DESCRIPTION OF THE DRAWINGS

FIG. 3 is an enlarged, fragmentary, perspective view of the shear bar and its mounting, certain parts being shown as broken away or indicated diagrammatically for the sake of clarity in the drawings;

FIG. 4 is a vertical end elevational view of the shear bar and its mounting taken along line 4—4 in FIG. 3;

FIG. 4a is a perspective view of the cam means shown in FIG. 4;

FIG. 9 is a plan view taken along the line 9—9 in FIG. 3; and

FIG. 10 is a sectional view taken along the line 10—10 in FIG. 9.

DESCRIPTION OF THE PREFERRED EMBODIMENT

Means are provided for adjusting and holding the outer end of the shear bar, for adjusting the center portion of the shear bar relative to the chopping cylinder, and for adjusting the inner end of the bar, all adjustments being made at a common adjusting station AS (FIG. 3 & 10) at the outer or operator's side of the harvester.

Figure 1:
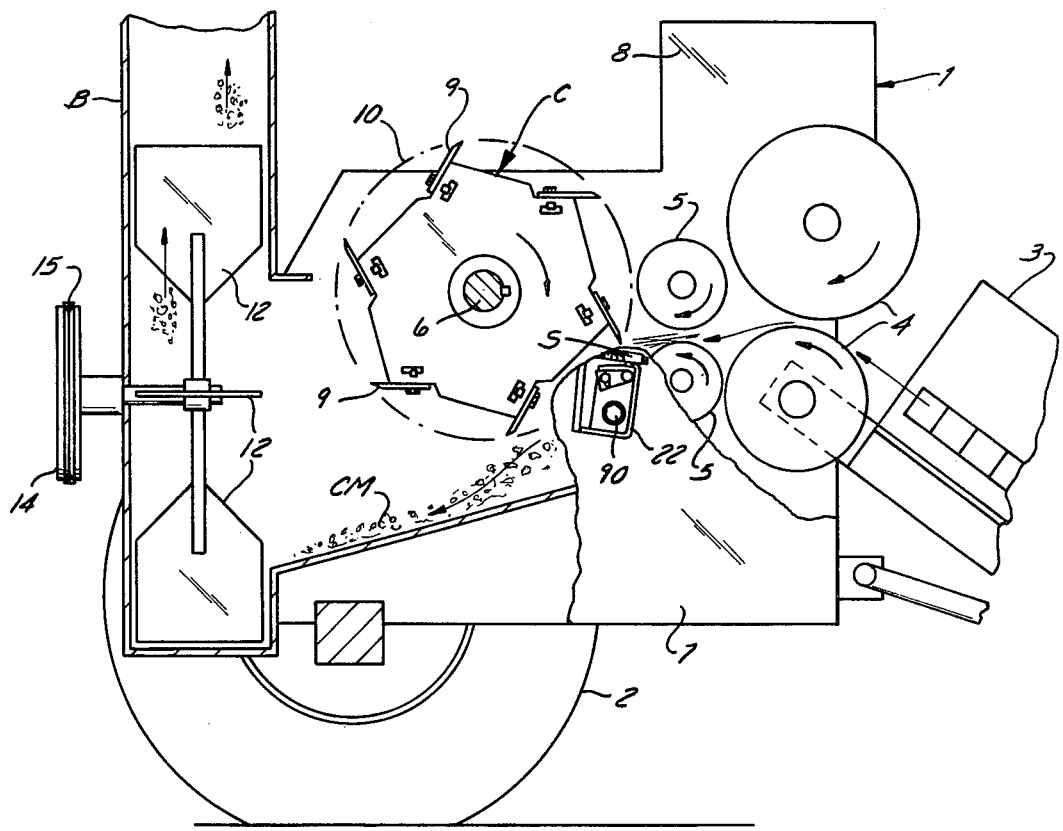
FIG. 1 is an elevational view partially in section of a forage harvester embodying the present invention.
Figure 2:
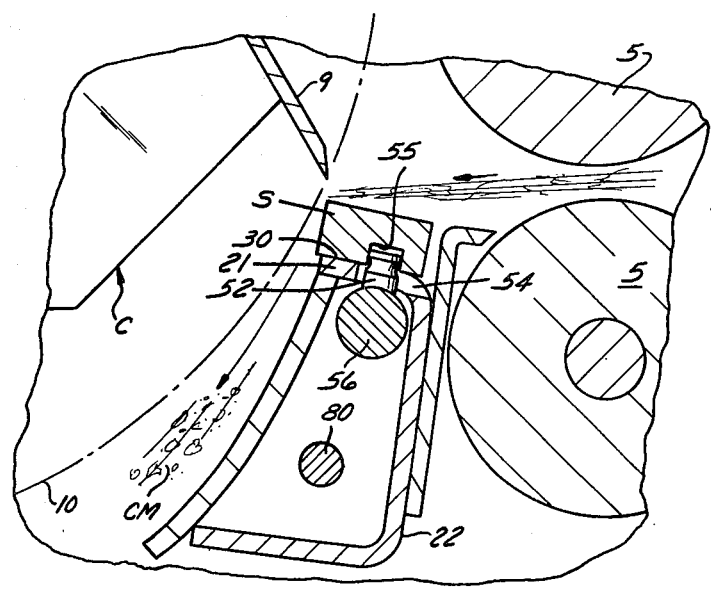
FIG. 2 is a fragmentary, enlarged view of a portion of the harvester shown in FIG. 1, in section and showing the shear bar and its mounting.
Figure 7:
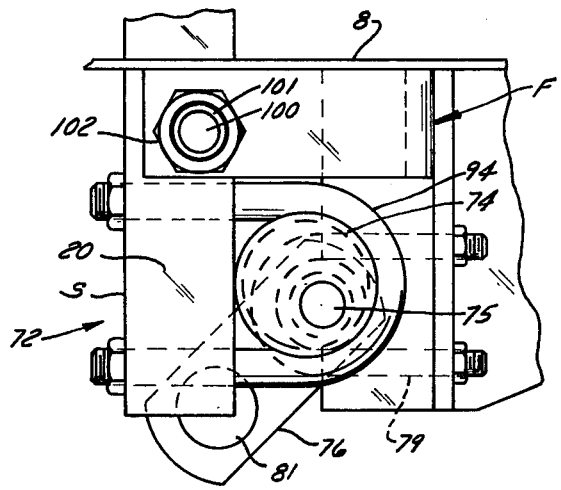
FIG. 7 is a plan view taken generally from the line 7—7 in FIG. 6.
Figure 8:
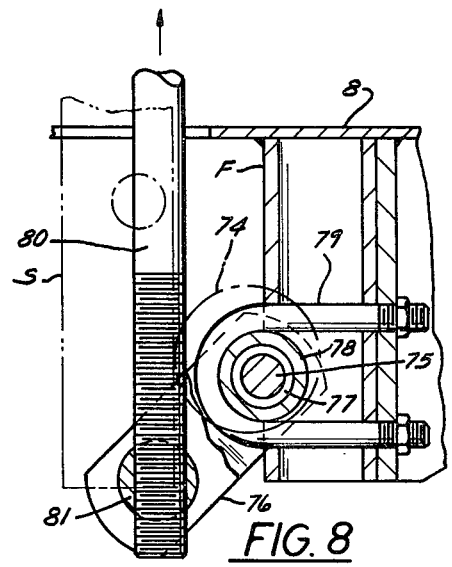
FIG. 8 is a sectional view taken along the line 8—8 in FIG. 6.

A forage harvester embodying the present invention is shown in FIG. 1 as including a main frame 1 having ground engaging wheels 2 (only one shown) at opposite sides and a crop receiving portion 3 which delivers the crop in a well known manner to pairs of opposed feed rolls 4 and 5. A rotating chopping cylinder C is journalled on a shaft 6, which extends between the vertical side wall 7 and 8 of the main frame 1 for rotation about its longitudinal axis. The cylinder C is shown as including a series of circumferentially spaced conventional knives 9 which, when the cylinder C is rotating, define an imaginary cylindrical surface 10. A blower B including a rotatably multi-paddle fan 12 is located at the rear of the forage harvester and acts to receive cut crop material CM which is cut by the cylinder C and thrown rearwardly into the blower. The paddles of the multi-paddle fan 12 are caused to rotate by a pulley 14 which is driven by an endless belt 15 from a power source (not shown) in a conventional manner.

A cutter bar or shear bar S is positioned immediately forward of the chopping cylinder C in closely adjacent relationship thereto, whereby the knives 9 may function in combination with the cutter bar S to cut crop material fed to the cylinder by the feed rolls 4 and 5. The cutter bar S extends laterally between the side walls 7 and 8 parallel to the longitudinal axis of the cylinder C and includes ends 18 and 20 which project outwardly from the side walls 7 and 8, respectively. The cutter bar S is supported by an upper flange 21 of a laterally extending cutter bar support channel 22, the support channel being rigidly supported at its opposite ends by the vertical side walls 7 and 8 within contour slots 24 and 26 respectively and is positioned such that the opposite ends 22a and 22b of the support channel 22 extend outwardly beyond the side walls 7 and 8 respectively.

The upper flange 21 of the cutter bar support channel 22 includes a flat upper generally horizontal cutter bar support surface 30 defining a plane which generally includes the longitudinal axis of the cylinder C. The support surface 30 of the upper flange 21 is intended to provide slideable support for the cutter bar S such that the cutter bar S is movable in a generally horizontal plane toward and away from the cylinder C, whereby the gap formed between the knives 9 and the shear bar S can be adjusted to compensate for wear of the knives and to facilitate accurate alignment of the cutter bar S.

In order to facilitate such adjustments or alignments of the cutter bar S, the outer end 18 is releasably secured by a set screw 32 and by a threaded cutter bar adjustment stud 34. A generally vertical plate 36 is welded or otherwise rigidly secured to the side wall 7 to project perpendicularly outwardly therefrom and to provide a cutter bar stud support at the outer end of the bar S. A generally horizontal angular bracket 38 is also rigidly secured to the side wall 7 adjacent the upper end of the vertical plate 36 and projects perpendicularly out from the side wall. The set screw 32 is received through a threaded bore in the horizontal angular plate 38 whereby the lower end of the set screw can be received against the upper surface of the projecting end of the cutter bar S. The set screw 32 thus provides a means for securing the outer end of the cutter bar S firmly against the cutter bar support surface 30.

To facilitate generally horizontal adjustments of the outer end of the cutter bar S, i.e., movement of the outer end of the cutter bar S toward or away from the knives 9, a threaded cutter bar adjustment stud 34 is received through a generally horizontal bore in the vertical plate 36 and lock nuts 46 are received on opposite side of the vertical plate 36. The adjustment stud 34 includes a portion of reduced diameter 35 receivable in a generally horizontal bore 33 in the end of the cutter bar S and a shoulder 48 to be received against the cutter bar S and a restraining nut 50 is threadably received on the end of the adjustment stud 34 and against the cutter bar S whereby the cutter bar S may be clampingly secured between the shoulder 48 and the nut 50. By alternately loosening and tightening the nuts 46 on either side of the plate 36, the adjustment stud and cutter bar can be moved toward or away from knives 9.

In order to provide means for both adjusting the position of the central portion of the cutter bar to afford accurate spacing between the central part of the cutter bar and the cutting cylinder and for restraining the center portion of the cutter bar S against slideable movement away from the knives 9, due to the force on the cutter bar generated by the chopping action, a cutter bar guide pin 52 constituting a projection or portion which is rigidly secured to the end of an elongated shiftable member comprised of a cutter bar support rod or shaft 56, which is received within the channel 22 and which has extending ends projecting outwardly beyond the end 22a of the channel 22. The bar S has a bore 55 in its central portion and channel 22 has an opening 54 through its central portion. Projection 52 extends through opening 54 and into bore 55. The elongated support shaft 56 is disposed below cutter bar S and has a longitudinal axis parallel to the cutter bar S and parallel to the longitudinal axis of cylinder C. The elongated support shaft 56 is supported at its outwardly extending end 58 by means for releasably preventing rotation of the shaft and including a generally vertically orientated plate 60 welded or otherwise rigidly secured to the outwardly extending end 58. The vertical plate 60 includes a slot 62 therein spaced from and transverse to the axis of the support rod 56 and a bolt 65 is slideably receivable through slot 62 and threadably received within a bore 64 in a vertical rigid plate 66, in turn welded or the like to the end 22a of the channel 20. The end of the support shaft 56 supporting the guide pin 52 is biased upwardly against the channel 22 by an inclined guide surface 68 of a bracket 70 welded within channel 22.

By rotation of the support rod 56 in a counterclockwise direction, as viewed in FIG. 4, by applying a wrench or the like to the nut 56a welded to the outwardly extending end 58 of the shaft 56, the guide pin 52 can be caused to distort the center portion of the cutter bar S toward the knives 9, and when the plate 60 is then secured against movement, the support rod 56 and guide pin 52 will prevent the center portion of the cutter bar from movement away from the knives 9. Since the central portion of the cutter bar will frequently wear more than its ends, the adjustment feature is particularly useful in affording distortion of the central portion of the cutter bar toward the cutting cylinder to maintain uniform clearance between the cutting cylinder and the cutter bar along its length regardless of uneven wear of the cutter bar. The mechanical elements described above which project outwardly from the side walls 7 and 8 of the forage harvester are readily accessible to the operator; therefore, adjustment of the position of the cutter bar can be accomplished easily.

Inner end adjusting means are provided for adjusting the inner end of the shear bar, which is located in a relatively inaccessible location on the harvester, and which adjustment can be made from the outer, operator's side of the machine and at the adjusting station AS that is at a common location for the above-described adjustments. This location is shown at the left-hand end of the FIG. 3 showing.

The cylinder and shear bar shown in FIG. 3 each have an inner end located at the right-hand side of FIG. 3 and which are located in an inner end of said harvester which is generally inaccessible to the operator. The other or outer ends of the cylinder and shear bar are shown at the left-hand side of FIG. 3 and are located at what is commonly known as the operator's or outer side of the harvester and which is readily accessible to the operator standing alongside the machine. Adjustable means 72 are located and connected between the inner end of the shear bar and the harvester frame and this adjustable means takes the form of a cam 74 which has a shaft 75 positioned eccentrically with respect thereto and extending downwardly therefrom. The cam 74 and shaft 75 are welded together. A bifurcated crank 76 is welded to the lower end of shaft 75. Shaft 75 is mounted in the sleeve bearing 77, which in turn is located within the bearing housing 78, which housing 78 is rigidly secured by U-bolt means 79 to the frame F of the machine.

An elongated adjusting member in the form of a rod 80 is connected to the free end of the crank 76 being threadably received by bearing block 81 which in turn is pivotally connected about axis 82 to the bifurcated end of the crank. The rod 80 extends generally along the length of the shear bar and terminates in an outer adjusting end 90 located adjacent the outer end of the shear bar. The outer end 90 of the rod 80 extends through plate 66 of the frame and has an integral head 92. By rotating head 92, the rod 80 rotates and consequently swings the crank 76 and rotates the cam 74. The cam 74 is held firmly against the shear bar by U-bolt means 94.

In this manner the inner end of the shear bar can be conveniently and accurately adjusted relative to the cylinder from the position at the operator's side of the machine.

Figure 6:
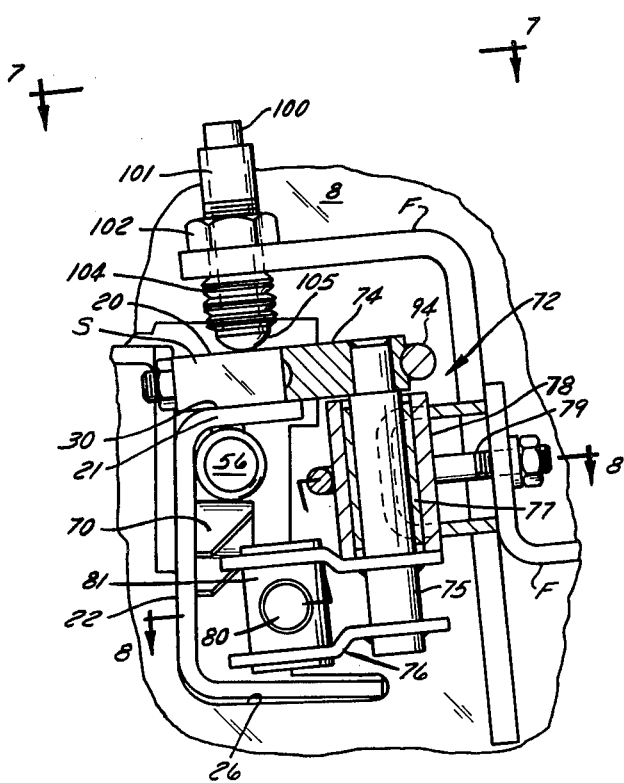
FIG. 6 is an elevational view taken generally from the line 6—6 in FIG. 3 and showing the inner end of the shear bar and its mounting, but on an enlarged scale.
Figure 5:
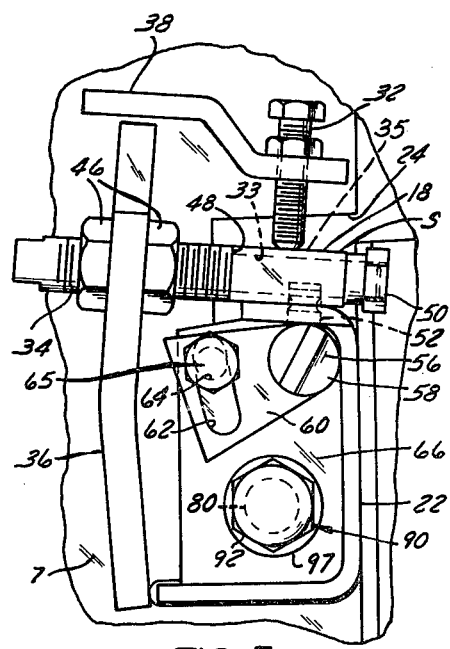
FIG. 5 is an elevational view of the shear bar and its mounting taken generally from the line 5—5 in FIG. 3, but on an enlarged scale.

Means are also provided for holding the shear bar down tightly on its channel mounting 22 and this takes the form of a plunger 100 which extends through a sleeve 101 that is threadably engaged in the frame member F (FIG. 6). A stack of belleville springs 104 urge the head 105 of the plunger 100 down tightly on the shear bar, thereby holding the latter firmly against its mounting. This biased loading of the shear bar against its mounting nevertheless permits the cam to shift the shear bar relative to the cylinder.

RECAPITULATION

The present invention provides a method and means for selectively adjusting the outer end, the central portion or the inner end of the shear bar relative to a rotating cylinder, all of the adjustments being made from a common adjusting station located at the operator's or outer side of the harvester. These adjustments can thus be conveniently and accurately made by the operator and by simply listening for the contact noise or "tick" which results when that portion of the shear bar makes initial contact with the rotating cylinder as it is being adjusted toward the cylinder. There is no need for the operator to crawl around or expose his hands to the area of the rotating cylinder and an accurate adjustment of the entire bar can thus be quickly and safely made.

I claim:

1. A forage harvester of the type having a rotatable chopping cylinder and an elongated shear bar located adjacent and generally parallel to said chopping cylinder for cutting cooperation therewith, said cylinder and shear bar each having an inner end located inwardly of said harvester and each also having an outer end located adjacent an outer side of said harvester and at an adjusting station easily accessible to an operator of said harvester, said shear bar also having a central portion, said harvester having a frame means for mounting said cylinder and shear bar, adjustable means located at said station for selectively adjusting the outer end and the central portion of said shear bar relative to said cylinder while the latter is rotating, a shear bar inner end adjustable means for adjusting the inner end of said shear bar relative to said cylinder while the latter is rotating, said inner end adjustable means being located and connected between said inner end of said shear bar and said frame means, and an axially shiftable elongated adjusting rod having one end connected with said inner end adjustable means and extending generally along the length of said shear bar and terminating in an outer adjusting end which is located at said adjusting station and adjacent said outer end of said shear bar for adjusting said inner end adjustable means to thereby vary the position of said inner end of said shear bar relative to said cylinder while the latter is rotating, said inner end adjustable means comprising a rotatable cam abutting against said inner end of said shear bar and a crank rigidly connected to said cam, and wherein said elongated adjusting rod is connected at said one end to said crank, said outer adjusting end of said rod having a threaded portion, the outer end of said rod extending through said frame means at said outside of said harvester, and a threaded adjusting nut threadably engaged on said threaded portion whereby adjusting of said nut on said threaded portion causes said rod to shift axially and thereby swing said crank to rotate said cam and consequently shift said shear bar inner end.

2. The harvester set forth in claim 1 including spring biased means between said crank and said frame for taking any play out of the connection between said rod and said crank.

* * * * *